United States Patent [19]

Bell et al.

[11] Patent Number: 4,505,060
[45] Date of Patent: Mar. 19, 1985

[54] PROCESS FOR OBTAINING A COMPOSITE MATERIAL AND COMPOSITE MATERIAL OBTAINED BY SAID PROCESS

[75] Inventors: James A. E. Bell; Bruce R. Conard, both of Oakville; Douglas A. Hope, Mississauga, all of Canada

[73] Assignee: Inco Limited, Toronto, Canada

[21] Appl. No.: 503,679

[22] Filed: Jun. 13, 1983

[51] Int. Cl.³ .......................................... B32B 15/02
[52] U.S. Cl. .................... 40/27.5; 428/672; 428/629; 428/680; 148/31.5
[58] Field of Search ............... 40/27.5; 428/610, 672, 428/678–681; 148/31.5

[56] References Cited

U.S. PATENT DOCUMENTS

| | | | |
|---|---|---|---|
| 2,691,816 | 10/1954 | Siegel | 428/672 |
| 3,364,064 | 1/1968 | Wijburg | 428/672 |
| 3,778,238 | 12/1973 | Tyler et al. | 428/672 |
| 3,834,879 | 9/1974 | Chin | 428/672 |
| 4,046,644 | 9/1977 | Liska | 204/37 R |
| 4,082,908 | 4/1978 | Vanaglash, jr. | 428/672 |
| 4,089,753 | 5/1978 | McMullen et al. | 204/23 |
| 4,138,604 | 2/1979 | Harmsen et al. | 200/267 |
| 4,176,014 | 11/1979 | Ruscoe et al. | 204/23 |
| 4,292,377 | 9/1981 | Petersen et al. | 428/680 |
| 4,330,599 | 5/1982 | Winter et al. | 428/675 |
| 4,411,965 | 10/1983 | Rosegren et al. | 428/672 |

FOREIGN PATENT DOCUMENTS

| | | | |
|---|---|---|---|
| 2449029 | 5/1975 | Fed. Rep. of Germany | 428/672 |
| 27222 | of 1913 | United Kingdom . | |
| 244487 | 5/1927 | United Kingdom . | |
| 287641 | 3/1928 | United Kingdom . | |
| 934559 | 8/1963 | United Kingdom . | |

OTHER PUBLICATIONS

Merriman, A. D.; *A Dictionary of Metallurgy*, MacDonald & Evans, Ltd.; London; p. 91, (1958).
Russell, R. J.; "Properties of Inlay Clad Wrought Gold Alloys", *Solid State Technology*, 10 pages, (8/76).
Gove, P. B., ed.; *Webter's Third New International Dictionary* p. 441, PE 1625 I61 (1961).
*Electroplating Engineering Handbook* (3rd Ed.), A. Kenneth Graham, Van Nostrand Reinhold Company (C) 1971, pp. 242 and 255.
Rex F. Pearce and R. W. Fraser, Canada's New Nickel Coins, *Canadian Mining J.*, vol. 89, Dec. 1968, pp. 45, 46.
Louis Weisberg and A. Kenneth Graham, Gold Plating, *Trans. Electrochem. Soc.*, 80, 509–520 (1941).
Edward A. Parker, "Barrell Gold Plating", *Plating*, 36, 448–451,516,744 (1949).
Edward A. Parker, "Electroplating of Gold Alloys", *Plating*, 38, 1256–1259 (1951) & 39, 43–46, 50 (1952).
Dr. Edward A. Parker, Recent Developments in Gold Alloy Plating", *Plating*, 45, 631–635 (1958).
Edward A. Parker, "Precious Metals", *Plating*, 46, 621–627 (1959).
Derwert Abst., 83–713638/29, CPI (Sec. M13), Sep. 7, 1983.
Chem. Abst. 99:130401m, 1983.
Chem. Abst., vol. 35, 3534(6), 1941.
Anon, *Karat Gold Alloys for Jewelry*, pp. 262–263.

*Primary Examiner*—L. Dewayne Rutledge
*Assistant Examiner*—John J. Zimmerman
*Attorney, Agent, or Firm*—Raymond J. Kenny; Miriam W. Leff

[57] ABSTRACT

A process for producing a composite material comprising a base having a nickel surface and a gold layer metallurgically bonded to the nickel of the base and having sufficient nickel to increase the hardness of the gold layer but insufficient to significantly destroy the distinctive color of the gold layer comprises depositing the gold layer on the nickel and annealing the composite structure to provide the metallurgical bond between the nickel and gold and to interdiffuse said metals, and the composite structure obtained by said process. The composite material is particularly useful as a coinage structure.

8 Claims, 1 Drawing Figure

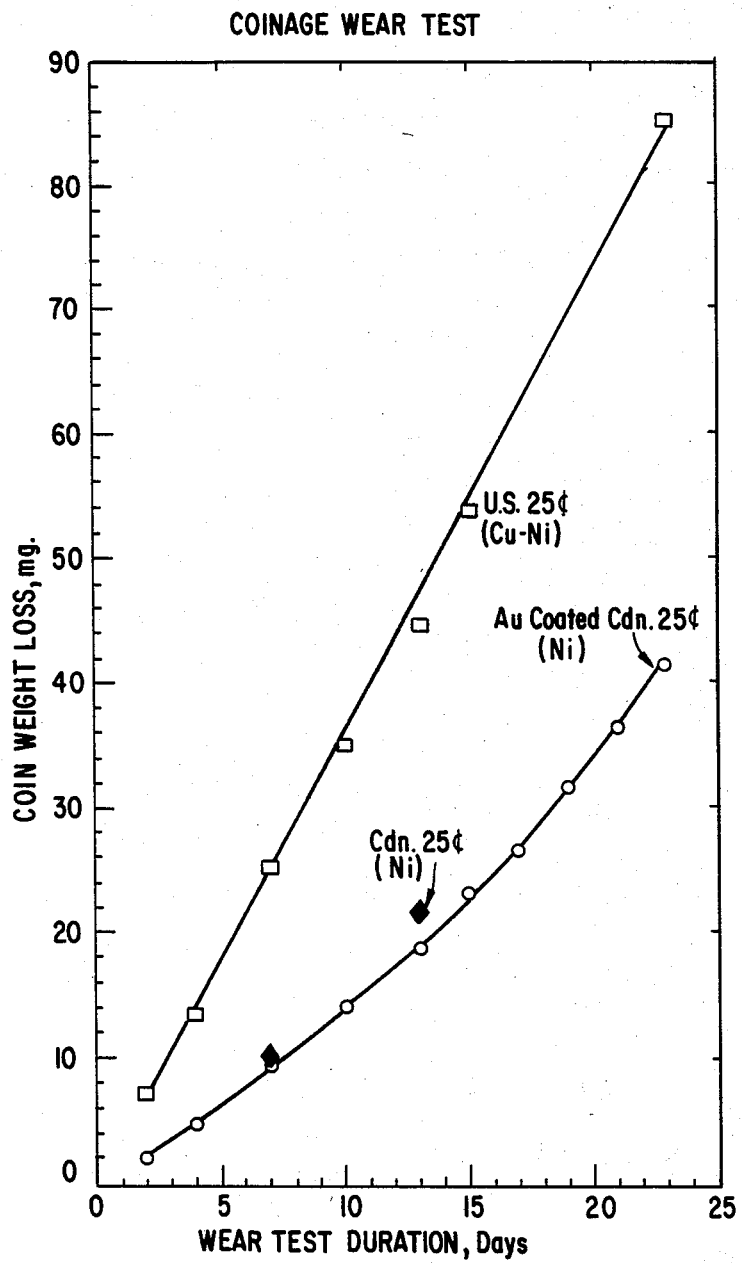

PROCESS FOR OBTAINING A COMPOSITE MATERIAL AND COMPOSITE MATERIAL OBTAINED BY SAID PROCESS

The present invention is concerned with a composite material particularly useful for tokens and coins, and more particularly with tokens or coins having a nickel base and a gold surface.

Essentially pure or low alloy content gold coins have been used since the time of the Lydians but in today's world, such coins must have high face value because of the intrinsic value of the metal. As of this writing gold has an intrinsic value of the order of $15.60 (Canadian) per gram. As of now, gold coins exist only essentially as collector or investment items and do not circulate in the sense of that term as applied to 25¢ pieces. If widespread circulation of gold coins existed, it would be found that gold, like silver, is too soft for everyday coinage use.

For these reasons the Canadian 25¢ piece was changed from a silver-copper alloy to pure nickel in 1968. In 1965 the U.S. 25¢ piece was changed from a 90 silver-10 copper alloy to a 75% Cu-25% Ni face layer sandwiching a pure copper core. Other countries have switched to copper based coinage containing Cu plus Al or Zn or Ni or a combination of the latter elements.

Actual studies of the wear of coinage alloys as a function of the number of years in service are relatively few, but the wear rates for the Ag-Cu, Cu-Ni and Ni are well established and are shown in Table 1.

TABLE 1
HISTORICAL WEAR DATA

| Year | Coin | Material | Wt. (g) | Average Wear Rate mg/yr |
|---|---|---|---|---|
| Current | U.S. 5¢ | 75% Cu—25% Ni | 5.0 | 4 |
| Pre-1965 | U.S. 25¢ | Ag—Cu* | 6.25 | 7 |
| Pre-1968 | Can. 25¢ | Ag—Cu* | 5.85 | 6 |
| Current | Can. 5¢ | Ni* | 4.55 | 0.9 |

*Canada's New Nickel Coins, reprinted from Canadian Mining Journal, December, 1968.

Examination of Table 1 shows that the best alloy from a wear viewpoint is pure Ni whose wear rate is ¼ that of cupro-nickel (75% Cu, 25% Ni) and 1/6 that of the 90% Ag-10% Cu formerly used. Nickel is also superior to Cu-Ni alloys and Ag-Cu alloys in terms of corrosion properties. Nickel maintains its bright appearance for longer than its normal service life of 20 to 40 years. The next best alloy as far as corrosion properties of existing coinage is cupro nickel (75% Cu-25% Ni).

Thus, for a silver colored coinage material pure nickel is by far the best. It also possesses unique magnetic properties between those of iron and non-magnetic alloys which allow it to be easily discriminated in either mechanical or electrical coin operated vending machines.

Automated vending machines, telephones, transit services, etc. are rapidly becoming more prevalent. For instance the number of vending machines in Canada is now estimated to exceed one million units. In many cases the object vended exceeds the value of one dollar and requires an excessive number of 25¢ coins. There is a large need for coins of face value exceeding 25¢. In addition to requirements for high denomination coinage for vending machines there is an advantage to saving costs associated with circulating new paper money, e.g. in excess of 5¢ per year to replace a paper dollar.

However, if one, two and perhaps five dollar coins were added to the existing 5¢, 10¢, 25¢ coins a problem would arise. If the coins were all pure nickel and the size gradually increasing, the size of the dollar coins would be too large to carry around in a pocket. If the sizes were intermediate between 5¢, 10¢ and 25¢ and all the coins were pure nickel the public would likely find coin discrimination difficult. If the coins were made of a brass, bronze, or cupro nickel bronze alloy they would likely have inadequate wear properties and they would also tarnish quickly in service.

Cupro-nickel alloys (75% Cu-25% Ni) have the best corrosion or tarnish resistance of all of the copper base alloys, but they have a silver colour and the level of nickel must be reduced to less than 10% in order to obtain a golden color. At this level of nickel the alloy tarnishes. Attempts to introduce other elements such as Al, Zn into the cupro-nickel alloys have yielded golden-colored alloys of only marginally improved tarnish resistance, none being as good as cupro-nickel, and all being very inferior to pure nickel.

If a brass, bronze or other cupro nickel bronze alloys are employed for high denomination coins and they perform in an inferior fashion both physically and in appearance to the pure existing low denomination nickel coins, the high denomination new coins will likely lack public acceptance.

STATEMENT OF PROBLEM

A new material is required which has wear properties as good as or close to pure nickel, has the same tarnish resistance as pure nickel, and has a gold color.

BRIEF DESCRIPTION OF DRAWING

The accompanying FIGURE is a graph in which accelerated coinage wear (weight loss of coins in mg) is plotted against time in test (days).

DESCRIPTION OF THE INVENTION

The present invention contemplates a composite material, particularly a coin or token structure, comprising a base having at least a surface of nickel and bearing on the surface thereof a layer of gold at least about 0.1 μm thick up to e.g. about 1.5 μm or even 2.5 μm thick. The gold layer is metallurgically bonded to the nickel of the base and contains an amount of nickel sufficient to increase the hardness of the gold layer but insufficient to significantly destroy the distinctive color of the gold layer.

The token or coin structure of the present invention can be made by depositing, e.g. by electroplating, a layer of gold onto a nickel surfaced base and thereafter annealing the composite structure to provide a metallurgical bond therebetween and to interdiffuse nickel of the base and gold of the surface layer.

DETAILS OF THE INVENTION

In order to provide those skilled in the art with greater detail with respect to the present invention, the following paragraphs set forth particulars and alternatives contemplated by the inventors to be within the scope of the invention as hereinbefore described.

The base of the composite structure of the invention is advantageously made of essentially pure nickel but can be made of a high nickel alloy, i.e., containing greater than about 50% nickel, which has corrosion resistance and workability substantially equivalent to that of pure nickel. However, nickel alloys containing less than 50% nickel, e.g., 75% Cu, 25% Ni, may be used but such alloys are less preferable. When used in this specification and claims the term "nickel" includes such nickel alloys. Generally speaking, the base of a coin or token structure is monolithic, i.e. made wholly of a single material. However, if desired, the base can be a composite or a sandwich structure provided the surface is nickel.

In physical form, the base of the token or coin structure is of coin thickness e.g. up to about 0.6 cm but can be of any desired width and length. For example, the base can be sheet or strip out of which coin or token blanks can be stamped. Alternatively, the base can be a coin or token blank stamped from a sheet of nickel or any intermediate form of the coin or token. Specifically, the base can be a blank which has been sized or sized and coined, or sized, coined and rimmed or sized, coined, rimmed and milled. Those skilled in the art will appreciate that gold plating on each of the alternative types of coin or token bases will result in the front and rear of the coin or token having a gold color. However, plating done prior to rimming and milling will result in coins having an edge with the appearance of nickel. Alternatively, the substrate can be placed on a moving band or can be masked so that the gold deposit can occur on one side or selected areas.

The gold on the nickel surface of the base is advantageously electrodeposited as pure (24 KT) gold from an electroplating bath using conditions applicable to obtaining a pure electrodeposit. For purposes of this specification and claims, however, gold need not be 100% pure. For purposes of this invention, the term "gold" includes not only pure gold but also yellow alloys and reddish yellow alloys which may contain silver, copper, nickel, a platinum-group metal and combinations thereof. Gold containing up to about 8% to 10% by weight nickel will retain its gold color equivalent to the colour of 14 KT to 18 KT gold-silver-copper alloy.

The gold layer on the nickel surface of the base is advantageously electrodeposited from a cyanide type bath. Such baths are usually of proprietary nature. However, the general types of cyanide baths and conditions of operation are set forth in standard reference sources such as Electroplating Engineering Handbook (3 ed.) A. Kenneth Graham, Van Nostrand Reinhold Company (C) 1971 page 242 and in References 1, 2, 29, 30, 31, 32 and 33 listed on page 255 of that work. It is also within the contemplation of the present invention to provide gold layers of the requisite thickness by means other than electroplating provided, of course, that the quality of the adhesion of the gold layer to the nickel is at least equivalent to that provided by electroplating. As those skilled in the art are aware, the quality of adhesion of an electroplate depends to a large extent on the care taken in surface preparation and cleaning of the base to be plated. In this regard Chapter 3 of the aforecited Electroplating Engineering Handbook entitled Metal Surface Preparation and Cleaning is recommended to those desiring to practice the present invention.

In producing the composite structure of the present invention, the annealing step to achieve the metallurgical bond between gold and nickel and to harden the gold is an important feature. Annealing can be carried out any time after deposition of the gold layer, either before or after working or mechanical operation on the composite material. The conditions of temperature and time of annealing are selected so that an interdiffused layer of gold and nickel is achieved without loss of the desired surface color. For example, with a pure nickel base and a pure gold deposit averaging 0.3 $\mu$m thick, effective annealing in hydrogen at 450° C. may be achieved in a short time e.g., in the range of about 2 to 5 minutes. This annealing time has been determined as residence time in a 5 cm tube furnace under laboratory conditions. Those skilled in the art will appreciate that commercial scale furnacing may vary in temperature and time. Nickel has a significant whitening effect on gold. After approximately 6 minutes of annealing under those specified laboratory conditions, the whitening effect of nickel predominates and the golden colour is lost. Annealing under the same conditions for less than two minutes is insufficient to produce the required metallurgical bond. While this example of annealing teaches an effective annealing procedure operable in the context of the present invention, variations are obviously possible. For example, annealing can be conducted at lower temperatures e.g., down to about 350° C. for longer times. Hydrogen can be replaced as an annealing atmosphere with any atmosphere, e.g., cracked ammonia, argon, etc. which will prevent oxidation of the nickel. In addition, if alloy gold is used as the layer, less nickel diffusion can be tolerated and therefore annealing should be carried out at temperatures lower than 450° and for times less than those employed for pure gold. Still further, if gold is employed in thicker layers e.g., from 0.5 to 1.0 $\mu$m, somewhat greater times or higher temperatures should be employed in annealing in order to permit diffusion of some nickel to the outer-most volume of the gold layer in order to induce increased hardness throughout the gold layer. Conversely, extremely thin gold layers e.g., about 0.1 $\mu$m must be annealed for very short times in order to retain the visual yellow effect of the gold. Annealing time is also dependent upon the thickness of the nickel-containing base, generally longer times being necessary with thicker bases. The type of heating equipment also is determinative of annealing times. For example, with high frequency induction skin heating, shorter times can be used because there is no need to allow time for the entire base to come to annealing temperature. In general, annealing can be carried out at temperatures of about 350° to about 650° C. for about thirty minutes to about a few seconds.

The composite structure of the present invention is particularly adapted to be used as coins or tokens, other structures in which a golden appearance, wear resistance and corrosion reistance are desirable are within the contemplation of the invention. Such other structures include flatware, plumbing fixtures and the like.

EXAMPLE 1

The following coins were dipped into a 5 wt.% NaCl solution which had been adjusted to pH 4 with nitric acid once per day for four days and allowed to air dry at room temperature the balance of the day.

1. Pure Ni Canadian 25¢.
2. A U.S. 25¢ piece containing outer faces of 75%Cu-25%Ni and a copper core.
3. A gold coated nickel coin, with the gold coating prepared according to the procedure detailed below.
4. A 1983 British Pound containing 75%Cu-18%Zn-7%Ni.
5. A gold coated 75%Cu-25%Zn coin, with the gold coating prepared following the same procedure as 3.

Results

The surfaces of the pure Ni coin (1) and the new gold on Ni coin (3) were not visibly tarnished. The U.S. cupro-nickel 25¢ piece (2) lost its metallic luster but had no visible evidence of a tarnish. All the other coins including the British Pound (4) and the Au on brass composite (5) lost their metallic luster and had objectionable tarnish formed on their surfaces.

These results show that the latter two coins (4) and (5) are unsuitable as high denomination coins.

Method of Preparation of the New Au on Ni Composite Coinage Material

A mint Canadian 25¢ pure nickel coin 1 was cleaned in a mild acidic solution and plated at 60° C. at 5 milliamps per square centimeter for 1–2 minutes from a standard cyanide-type Au plating bath obtained from Johnson Matthey and Mallory Ltd. under the trademark "Orosene 999 24 KT bright gold". The weight of the Au plated was 6 mg and the apparent calculated thickness of the Au layer was 0.3 μm. This coin was subsequently annealed at 450° C. for 3 to 4 minutes in pure hydrogen. This procedure on this substrate gives a coin which is gold in color lighter than the colour of 24 KT gold.

EXAMPLE 2

Eight Canadian 25¢ pure nickel coins were plated with 6 mg of Au each according to the procedure in Example 1. Four of the coins were subsequently annealed at 450° C. for 4 min in pure hydrogen, the other four coins were unannealed.

The thus prepared coins were subjected to wear testing. The apparatus for wear testing in this Example and in other Examples herein comprises a ceramic jar mill having internal dimensions of 4 inches high (10.16 cm) and 5 inches wide (12.7 cm). The mill was closely lined with a zippered bag made of metallographic polishing cloth. The coins are introduced into the bag along with an equal weight of metal shot 0.3 to 1.9 cm in diameter made of an alloy known as HASTELLOY TM alloy C containing nominally (in weight percent) 54% nickel, 17% molybdenum, 15% chromium, 5% iron and 4% tungsten, 13 grams of leather strip about 3.8 cm×0.3 cm×0.15 cm and 7 grams of cork No. 00 about 0.12 cm in diameter. The leather strip is soaked with synthetic sweat solution (40 g NaCl, 5 g $Na_2HPO_4$, 4 ml lactic acid, balance, to 4 l, distilled water), the bag is zippered closed, fitted into the ceramic jar mill and then rotated at less than critical speed for numbers of days with the leather being periodically rewet with synthetic sweat solution. The mill was rotated for 5 days at 45 rpm.

Results

The mean weight loss of the annealed coins was 6.8 mg while that for the unannealed coins was 9.0 mg. The annealed samples had a more uniform color than the unannealed sample.

EXAMPLE 3

Five Canadian pure Ni 25¢ pieces were plated with 24 KT Au, with the Au plated according to the procedure set forth in Example 1. The coins were placed into a 5 cm tube furnace having a $H_2$ atmosphere at 450° C. for times ranging from about 1 to about 10 min. The surface of the Au plated coins retained their 24 KT appearance up to 3 min. After about 4 minutes the color matched the color of 18 KT (75% Au, 15% Ag, 10% Cu) gold. After about 6 minutes the gold color had largely disappeared.

EXAMPLE 4

Two samples of the Au coated pure Ni Canadian 25¢ pieces containing about 6 mg of Au in a layer 0.3 μm thick annealed at 450° C. for 4 minutes along with two U.S. cupro-nickel 25¢ pieces and two Canadian pure nickel 25¢ pieces were tumbled in the ceramic mill at 45 rpm in a cloth bag containing cork and leather wetted with a synthetic sweat solution and an equal weight of HASTELLOY C shot as described in Example 2. The weight loss of each coin was measured each day and the results plotted in FIG. 1. The data in FIG. 1 show that the wear rate of the U.S. cupro-nickel is approximately twice that of pure nickel and that the weight loss of the Au plated and annealed nickel coins was indistinguishable from pure nickel Canadian 25¢ pieces. It was not anticipated that a coin having roughly 6 mg of gold on nickel would still have a good surface appearance after 20 mg had worn away. Yet, even after losing 40 mg of weight the Au coated coin still retained its golden color and only on the edges of the coin was Au layer abraded away.

EXAMPLE 5

Eight pure Ni Canadian 25¢ pieces were Au plated using the procedure set forth in Example 1 and annealed at 450° C. for 4 min. The measured weight of gold electrodeposited was 6 to 8 mg per coin. These coins along with 8 Canadian nickel 25¢ pieces and 8 U.S. cupro-nickel 25¢ pieces were repeatedly placed by hand through a mechanical vending machine coin sorting mechanism manufactured by Coinco, 868 Progress Ave., Scarborough, Ontario, Canada.

After 8,000 cycles, the U.S. cupro-nickel coins had lost much of their knurled edge. The edge was quite smooth. After 10,000 cycles the Canadian nickel 25¢ piece showed some slight rounding of the edge and the Au plated and annealed Canadian 25¢ piece still retained their original golden color even on the edges.

After 18,000 cycles, the knurled edges on the Canadian 25¢ piece started to shor a slight wear. The Au plated and annealed coins still retained their original golden color on the coin faces after 18,000 cycles and showed the same slight knurled edge wear as the pure nickel 25¢ pieces. Some loss of golden color occurred on the edges after 18,000 cycles.

After 18,000 cycles, the total weight of Au on the coins was analyzed as 5.25 mg (average) indicating only about a 1.7 mg Au loss and 70% Au retained during the test. Eighteen thousand cycles corresponds to approximately 50 years of wear on a coin at an average use of once per day in a vending machine.

EXAMPLE 6

The same tumbling test as used in Examples 2 and 4 was repeated except that coinage charge consisted of 2 pure nickel Canadian 25¢ pieces, two U.S. cupro-nickel 25¢ pieces, 1 Canadian nickel 25¢ piece plated with 6 mg of Au and annealed as in Example 1 for 4 min at 450° C. in pure $H_2$, plus 1 Canadian nickel 25¢ piece plated with 12 mg of Au and annealed to have the same surface colour as the coin having 6 mg of Au after annealing. The tumbling mill was rotated for 1 day at 60 rpm, 3 days at 27 rpm and 1 to 5 days at 45 rpm. The mean weight loss of the coins after this treatment for 5 day and 9 day periods is shown below:

|  | 5 day mg | 9 day mg |
| --- | --- | --- |
| U.S. 25¢ cupro-nickel | 18.9 | 32.7 |
| Canadian 25¢ pure Ni | 6.2 | 14.6 |
| 6 mg Au on Canadian 25¢ | 6.9 | — |
| 12 mg Au on Canadian 25¢ | 7.4 | 15.8 |

The 6 mg and 12 mg Au coins were indistinguishable in visual appearance after the test.

Both retained their original golden colour even on the edges.

EXAMPLE 7

Two samples of pure nickel-base, gold electroplated (0.3 μm) coin stock were subjected to Auger analysis to determine the nature of the gold layer in the unannealed and annealed conditions. The annealing was carried out as set forth in Example 1. Analysis of the unannealed sample indicated essentially pure gold in the electrodeposited layer with a very sharp boundary to pure nickel of the base. The annealed sample showed essentially a 95%Au-5%Ni composition throughout the gold layer with a somewhat diffuse but relatively sharp boundary to the essentially pure nickel of the base.

EXAMPLE 8

The following specimens were dipped into a 5 wt.% NaCl solution, which had been adjusted to a pH of 4 with nitric acid, once per day, for 3½ days and allowed to air dry at room temperature for the balance of the day.

6. A gold coated 18/8 stainless steel base.
7. A gold coated 75%Cu-25%Ni base.

The gold was plated and the composite structures annealed essentially as described in Example 1. The gold plated stainless steel sample (6) showed evidence of tarnish. The gold plated cupro-nickel sample (7) showed a slight green oxidation product which was easily wiped off but might remain in crevices in use.

While in accordance with the provisions of the statute, there is illustrated and described herein specific embodiments of the invention. Those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. A composite coin comprising a base having at least two opposing surfaces of nickel and bearing on each of said surfaces a layer of about 0.1 μm up to about 2.5 μm thick of gold metallurgically bonded to said nickel base, said gold layer having been electrodeposited on each of said nickel surfaces and having present therein an amount of diffused nickel originating from said nickel of said base sufficient to increase the hardness of said gold layer but insufficient to significantly destroy the distinctive color of said gold layer.

2. A composite coin as in claim 1 comprising a coin or token structure wherein the layer of gold is about 0.1 μm to about 1.5 μm thick.

3. A composite coin as in claim 1 wherein said base is a monolithic base of essentially pure nickel and said gold layer apart from nickel is a layer of essentially pure gold.

4. A composite coin as in claim 1 wherein said base is a corrosion resistant nickel alloy.

5. A composite coin as in claim 1 wherein said base is a composite material, the outer surfaces being nickel.

6. A composite coin as in claim 1 wherein said base is a ferromagnetic material suitable for coinage operated machines.

7. A composite coin as in claim 1 prepared by a process comprising providing a base having at least two opposing surfaces of nickel, electrodepositing on said nickel surfaces a layer of gold at least about 0.1 μm up to about 2.5 μm thick and thereafter interdiffusing said gold into said nickel to form a metallurgical bond therebetween and to introduce into said gold layer an amount of nickel from said base sufficient to increase the hardness of said gold layer but insufficient to significantly destroy the distinctive color of said gold layer, wherein in the annealed condition the gold layer contains up to about 10% Ni.

8. A composite coin as in claim 7 wherein the gold layer contains up to about 5% Ni.

* * * * *